R. D. KING.
VARIABLE SPEED TRANSMISSION MECHANISM.
APPLICATION FILED MAY 8, 1915.
1,209,717.
Patented Dec. 26, 1916.
2 SHEETS—SHEET 1.
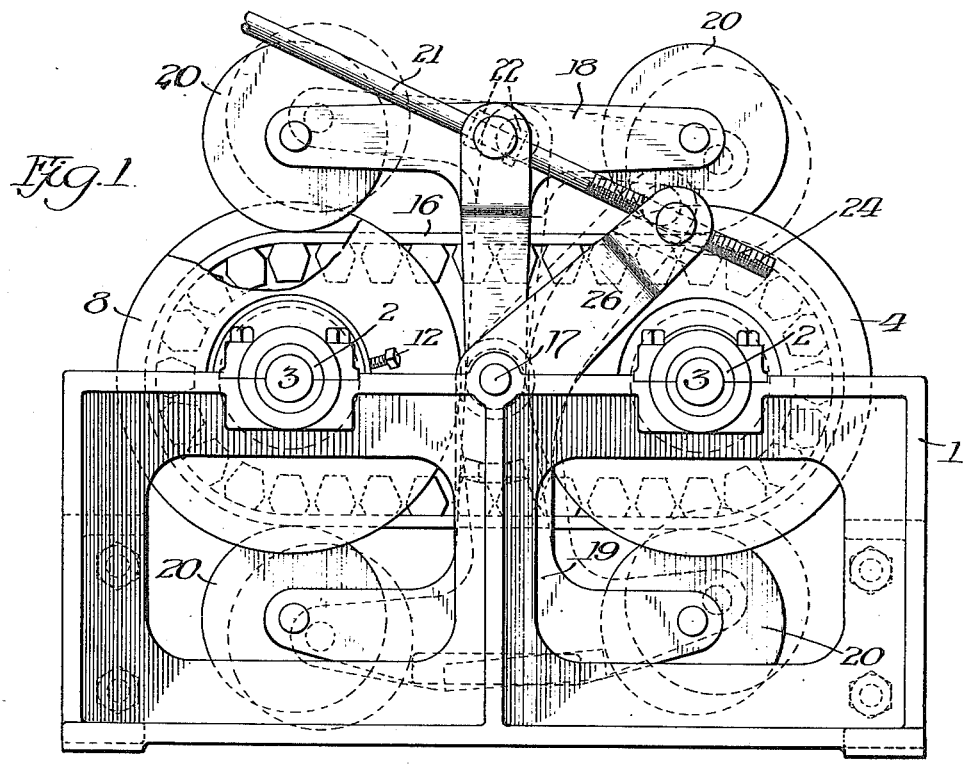
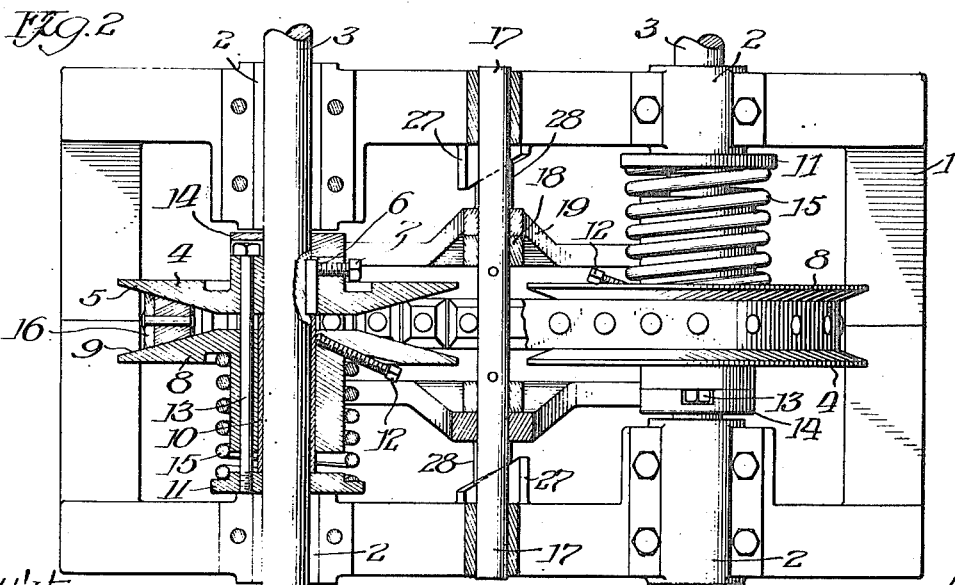

R. D. KING.
VARIABLE SPEED TRANSMISSION MECHANISM.
APPLICATION FILED MAY 8, 1915.
1,209,717.
Patented Dec. 26, 1916.
2 SHEETS—SHEET 2.
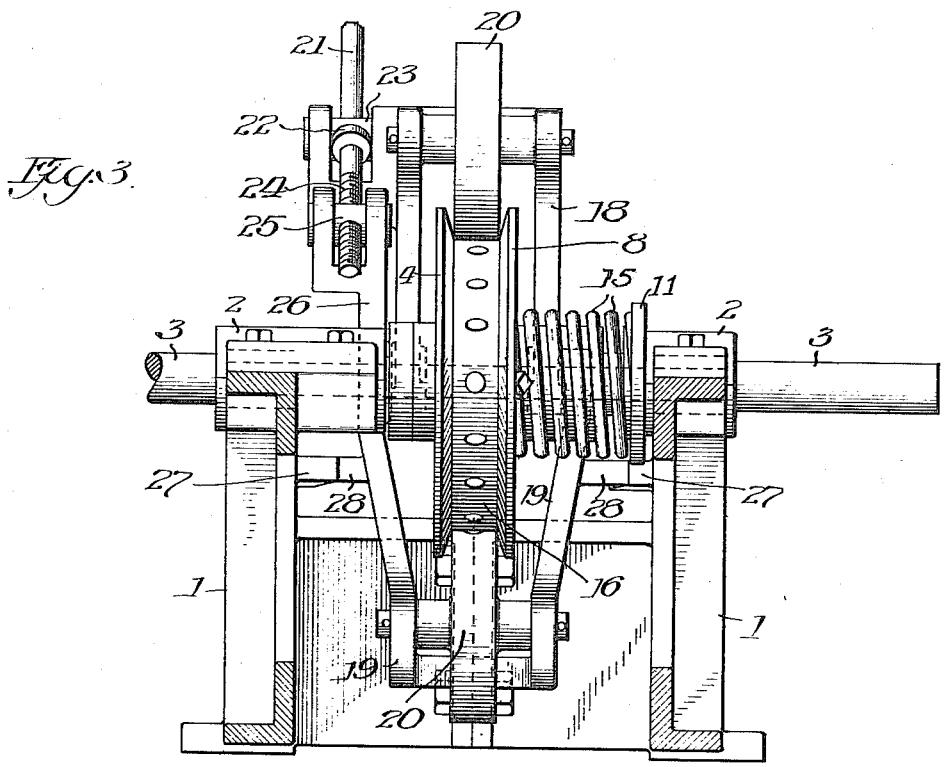
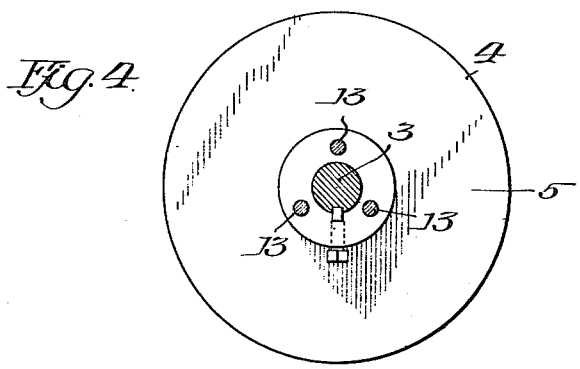

UNITED STATES PATENT OFFICE.

ROY D. KING, OF CHICAGO, ILLINOIS.

VARIABLE-SPEED-TRANSMISSION MECHANISM.

1,209,717.     Specification of Letters Patent.     Patented Dec. 26, 1916.

Application filed May 8, 1915.   Serial No. 26,705.

*To all whom it may concern:*

Be it known that I, ROY D. KING, a citizen of the United States, residing at Chicago, in the county of Cook and State of Illinois, have invented certain new and useful Improvements in Variable-Speed-Transmission Mechanisms, of which the following is a specification.

This invention relates to improvements in variable speed transmission mechanisms, whereby the structure and mode of operation is materially simplified and the liability to disarrangement is overcome. Previously known mechanisms of this character, in which both of the disks have been movable longitudinally of their shafts, have of necessity been provided with special thrust bearings to take up the side thrust of the disks. These bearings have been mounted on movable arms which control the position of the disks and considerable difficulty has been experienced in maintaining the bearings in proper condition to preserve the efficiency of the mechanism. Furthermore mechanisms of this character have been subject to the defect that as the sides of the belt wear it is allowed to move farther into the grooves between the disks, so that the belt becomes slack unless means is provided to take up the slack and maintain a proper tension.

It is the object of my invention to provide a variable speed transmission mechanism in which movable thrust bearings are eliminated, the wear of the belt is automatically compensated and novel means is utilized for varying the spacing of the disks, whereby speed regulation is possible.

Other objects and advantages of my invention will be apparent as it is better understood by reference to the following specification when read in connection with the accompanying drawing in which—

Figure 1 is a side elevation of the mechanism; Fig. 2 is a plan view, partially in section of the structure shown in Fig. 1; Fig. 3 is an end view thereof with a portion of the frame in section to more clearly illustrate the structure, and Fig. 4 is an elevation of one of the disks with the shaft and supporting rods in section.

Referring to the drawings, 1 indicates a suitable frame provided with two pairs of oppositely disposed bearings 2, supporting the shafts 3 in parallel relation. Mounted on each of the shafts 3 is a disk 4 having a cone-shaped face 5, the disk being secured to the shaft by a key 6 held in place by a set-screw 7.

A complementary disk 8, having a cone-shaped face 9, is slidably mounted on a sleeve 10, surrounding each of the shafts 3 and abutting the disk 4 at one end, and a ring 11 surrounding the shaft 3 at the other. Set-screws 12 are provided to fixedly secure the disks 8 to the sleeves 10, if desired. A plurality of rods 13 are disposed through the disks 4 and 8 and threadedly engage the rings 11, thus holding the rings in properly spaced relation with respect to the disks 4 and causing the disks 8 to rotate with the disks 4. Rings 14 protect the opposite ends of the rods 13. Springs 15 are disposed between the disks 8 and the rings 11 and bias the disks 8 in the direction of the disks 4. A V-belt 16 is disposed in the groove formed by the conical faces 5 and 9 of the disks 4 and 8 and constitute a power transmitting means therebetween. It is to be understood, of course, that other forms of power transmitting means, such as a chain, for example, may be employed.

Pivotally mounted on a shaft 17, disposed transversely of the frame 1, midway between the shafts 2 and 3, are a plurality of yokes 18 and 19, each supporting a pair of rollers 20, the rollers being adapted to engage the upper surface of the V-belt 16 within the groove between the disks 4 and 8. Where a chain is employed in place of the V-belt 16 the rollers 20 may be provided with teeth to engage the chain. A rod 21, having flanges 22 thereon, is disposed through an extension 23 of the yoke 18, the flanges 22 preventing longitudinal movement of the rod 21 with respect to the yoke 18. The end of the rod is threaded at 24 and engages a similarly threaded portion 25 on an upstanding arm 26 of the yoke 19 and, as will be readily understood, by turning the rod 21 by means of a hand wheel (not shown) or any other suitable means the yokes 18 and 19 may be swung about the shafts 17, so that the rollers 20 on one side of the shaft approach each other while the rollers 20 on the other side of the shaft 17 are separated, as is clearly shown in dotted lines in Fig. 1. Oppositely directed cam members 27 on the frame 1 engaging similar cam members 28 in the yoke 19 insure that the yokes 18 and 19 will be so disposed as to maintain the rollers 20 in proper lateral adjustment to contact with the belt 16 throughout the range of movement of the rollers 20.

Inasmuch as the rollers 20 are always in engagement with the V-belt 16 it will be readily understood that the belt may be moved inwardly between the disks 4 and 8 against the action of the spring 14 on one side of the shaft 17, while a corresponding outward movement of the belt 16 occurs on the opposite side of the shaft 17, with the result that the mean diameters of the effective driving portions of the respective pairs of disks 4 and 8 will be varied inversely with respect to each other. By thus varying the mean diameters of the effective driving portions of the pairs of disks the peripheral speed of the belt in the respective grooves may be varied at will, and considering one of the shafts 3 as the driving shaft while the other shaft 3 is the driven shaft, it will be understood that by the use of the mechanism described the speed of the driven shaft may be readily varied with respect to that of the driving shaft at the convenience of the operator.

It will be understood that the necessity for providing special thrust bearings is overcome in my present mechanism since all of the thrust is taken up by the springs 15 and that consequently the structure and mode of operation is much simpler and less liable to disarrangement than are similar structures of the prior art.

It will be apparent that various changes may be made in the form, construction and arrangement of the parts without departing from the spirit and scope of the invention, or sacrificing any of its material advantages, the form hereinbefore described being merely a preferred embodiment thereof.

I claim:

1. In a speed varying mechanism, the combination of a pair of parallel shafts, a pair of cone-shaped driving disks mounted on each of said shafts, one of each pair of said disks being fixedly secured to its respective shaft and the complementary disks being movable longitudinally of said shafts, means for biasing said movable disks toward said fixed disks, power transmitting means between the respective pairs of disks, and adjustable means engaging said power transmitting means and adapted to regulate its radial distance from the respective shafts, whereby the diameters of the effective driving portions of the respective pairs of disks may be varied inversely with respect to each other.

2. In a speed varying mechanism, the combination of a pair of parallel shafts, a pair of cone-shaped driving disks mounted on each of said shafts, one of each pair of said disks being fixedly secured to its respective shaft and the complementary disks being movable longitudinally of said shafts, means for biasing said movable disks toward said fixed disks, power transmitting means between the respective pairs of disks, a plurality of rollers engaging said power transmitting means, and means for adjusting said rollers to regulate the radial distance of said power transmitting means from the respective shafts, whereby the diameters of the effective driving portions of the respective pairs of disks may be varied inversely with respect to each other.

3. In a speed varying mechanism, the combination of a pair of parallel shafts, a pair of cone-shaped driving disks mounted on each of said shafts, one of each pair of said disks being fixedly secured to its respective shaft and the complementary disks being movable longitudinally of said shafts, means for biasing said movable disks toward said fixed disks, power transmitting means between the respective pairs of disks, a pair of pivotally mounted yokes, a pair of rollers supported by each of said yokes and engaging said power transmitting means, and means for swinging said yokes about their pivots to regulate the radial distance of said power transmitting means from the respective shafts, whereby the diameters of the effective driving portions of the respective pairs of disks may be varied inversely with respect to each other.

4. In a speed varying mechanism, the combination of a pair of parallel shafts, a pair of cone-shaped driving disks mounted on each of said shafts, one of each pair of said disks being fixedly secured to its respective shaft and the complementary disks being movable longitudinally of said shafts in opposite directions, springs for biasing said movable disks toward said fixed disks, power transmitting means between the respective pairs of disks, and adjustable means engaging said power transmitting means and adapted to regulate its radial distance from the respective shafts, whereby the diameter of the effective driving portions of the respective pairs of disks may be varied inversely with respect to each other.

5. In a speed varying mechanism, the combination of a pair of parallel shafts, a pair of cone-shaped driving disks mounted on each of said shafts, one of each pair of said disks being fixedly secured to its respective shaft and the complementary disks being movable longitudinally of said shafts in opposite directions, springs for biasing said movable disks toward said fixed disks, a power transmitting belt between the respective pairs of disks, and adjustable rollers engaging said belt and adapted to regulate its radial distance from the respective shafts, whereby the diameter of the effective driving portions of the respective pairs of disks may be varied inversely with respect to each other.

6. In a speed varying mechanism, the combination of a pair of parallel shafts, a pair of driving disks mounted on each of said shafts, resilient means tending to maintain the disks of the respective pairs in close relation, power transmitting means between the pairs of disks, and adjustable means engaging said power transmitting means and adapted to regulate its radial distance from the respective shafts, whereby the diameters of the effective driving portions of the respective pairs of disks may be varied inversely with respect to each other.

7. In a speed varying mechanism, the combination of a pair of parallel shafts, a pair of driving disks mounted on each of said shafts, resilient means tending to maintain the disks of the respective pairs in close relation, a power transmitting belt between the pairs of disks, rollers adapted to engage said belt, and means for adjusting said rollers to regulate the radial distance of said belt from said shafts, whereby the diameters of the effective driving portions of the respective pairs of disks may be varied inversely with respect to each other.

ROY D. KING.

Witnesses:
ERNEST H. MERCHANT,
W. T. WESTERBERG.